(12) United States Patent
Lee

(10) Patent No.: US 6,648,559 B1
(45) Date of Patent: Nov. 18, 2003

(54) SPHERICAL CUTTING TOOL

(75) Inventor: Young Bae Lee, Seoul (KR)

(73) Assignee: YG-I Co., Ltd., Incheon (CN)

( * ) Notice: Subject to any disclaimer, the term of this patent is extended or adjusted under 35 U.S.C. 154(b) by 0 days.

(21) Appl. No.: 09/831,668

(22) PCT Filed: Nov. 9, 1999

(86) PCT No.: PCT/KR99/00671

§ 371 (c)(1),
(2), (4) Date: May 11, 2001

(87) PCT Pub. No.: WO00/29153

PCT Pub. Date: May 25, 2000

(30) Foreign Application Priority Data

Nov. 12, 1998 (KR) .............................................. 98-48441

(51) Int. Cl.[7] .............................. B23B 27/00; B26P 1/12
(52) U.S. Cl. ........................................... 407/42; 407/54
(58) Field of Search .............................. 407/35, 40, 42, 407/54, 62, 63, 65, 113, 114; 606/80, 159, 170, 180

(56) References Cited

U.S. PATENT DOCUMENTS

| | | | | |
|---|---|---|---|---|
| 3,409,965 A | * | 11/1968 | Fisher | 407/54 |
| 4,167,944 A | * | 9/1979 | Banko | 606/107 |
| 4,527,930 A | * | 7/1985 | Harroun | 407/42 |
| 4,844,064 A | * | 7/1989 | Thimsen et al. | 606/80 |
| 4,934,881 A | * | 6/1990 | Tsujimura et al. | 407/118 |
| 5,049,009 A | * | 9/1991 | Beck et al. | 407/34 |
| 5,193,943 A | * | 3/1993 | Kim | 407/42 |
| 5,322,394 A | * | 6/1994 | Okanishi et al. | 407/32 |
| 5,636,948 A | * | 6/1997 | Rexius | 407/54 |
| 5,725,338 A | | 3/1998 | Cabaret et al. | |
| 6,082,935 A | * | 7/2000 | Hori | 407/54 |
| 6,152,657 A | * | 11/2000 | Packer et al. | 407/118 |
| 6,234,725 B1 | * | 5/2001 | Campian | 407/54 |

FOREIGN PATENT DOCUMENTS

| | | |
|---|---|---|
| EP | 0 591 122 | 9/1997 |
| EP | 0 559 961 | 1/1999 |
| SE | 0 591 122 A1 * | 6/1994 |

* cited by examiner

Primary Examiner—Daniel W. Howell
Assistant Examiner—Brian D Walsh
(74) Attorney, Agent, or Firm—Roberts, Abokhair & Mardula, LLC

(57) ABSTRACT

A spherical cutting tool such as a ball end mill, a tapered ball end mill and the like is disclosed, in which cutting edges are formed on a spherical surface. The tangential lines of the respective points of the cutting edges on a spherical surface are made to have a constant (helix) angle relative to the axis of the tool. A tooth can be formed with an eccentric relief, and the tooth reinforced with a smaller relief angle and a wider land width. Therefore, the tool can be operated at a higher feed rate, thereby making it possible to improve the machining efficiency.

14 Claims, 7 Drawing Sheets

SPHERICAL CUTTING TOOL

FIELD OF THE INVENTION

The present invention relates to spherical rotary cutting tools (also called spherical cutting tools) such as ball end mills, tapered ball end mills and the like, in which cutting edges are formed on a spherical surface.

Particularly, the present invention relates to the use of cutting edges with a constant helix angle on the spherical surface. As a natural consequence, it improves the cutting performance, the chip disposal and the surface roughness of the cut material. Also, the cutting edges can be formed with an eccentric relief on the land, provided the helix angle is constant; the tooth formed by the eccentric relief is reinforced with a smaller relief angle and a wider land width. Due to the reinforcement, the tool can be operated at a higher feed rate, thereby making it possible to improve machining efficiency.

BACKGROUND OF THE INVENTION

As shown in FIG. 1, the cutting edges of a conventional spherical cutting tool 10, like a ball end mill, consist of a portion of spherical cutting edge (also called spherical edge) 12 and a body with peripheral cutting edges (also called peripheral edge) 14. The spherical edge 12 serves as the main cutting edge, while the peripheral cutting edge 14 serves as auxiliary cutting edge.

In the case of cylindrical cutting tools, like square end mills, where the main cutting edges are formed on the periphery, the cutting edge has a constant helix angle relative to the tool axis. Thus by providing a proper helix angle to the cutting conditions, the performance of the tool can be markedly improved. If a cutting tool has a constant helix angle, the lengths of the cutting edges are extended, and therefore, the cutting force per unit length is reduced. Further, continuous cutting takes place and impact is minimized during the cutting. Consequently, surface roughness of the cut surface is made fine, precise cutting is possible, and the life expectancy of the tool is extended. That is because the helix angle also functions as the rake angle, and therefore, in the case of a cylindrical cutting tool, 30 degrees of constant helix angle is recommended for cutting steel, while 45 degrees is used for cutting aluminum and its alloys.

The helix angle is closely related to the lead and the tool diameter. As shown in FIG. 2, this relationship can be expressed by a formula $\tan H = \pi D/L$, where H is the helix angle, L is the lead, and D is the diameter of the tool. In the peripheral cutting edges of the spherical tool or in the main cutting edges of the cylindrical tool, if the lead is fixed, the helix H has a constant value, or an inverse case is realized. Therefore, the above advantages can be easily realized.

However, in spite of the fact that the performance of the tools can be significantly improved by providing a constant helix of a certain angle, the prior art does not include any such tool in which the spherical cutting edges have a certain constant helix angle relative to the tool axis. Instead, the cutting edges of prior art tools are arranged on the spherical surface in such a manner as to blend well with the peripheral cutting edges, without any coherent relationship or law. Examples of some prior art curves are illustrated in FIGS. 3A and 3B. This is due to the following reason.

Each cross section of the cylinder has the same diameter regardless of axial positions, while in a sphere the diameter D of each cross section is varied along the axial positions X, as illustrated in FIG. 4. Owing to this characteristic, even if the lead is decided, the tool diameter is varied along the tool axis, and therefore, the helix angle H which is based on the formula $\tan H = \pi D/L$ has to have a different value at each position. As a result, a constant helix angle cannot be expected.

Meanwhile, if any curve 51, 52, or 53 is located on a sphere connects two points 54 and 56 intersecting the tool axis and the surface of sphere is rotated around the tool axis, the track forms a sphere as shown in FIG. 5. Therefore, if cutting edges are arranged on a sphere regardless of the shape and constancy of the helix angle, and if a rotary cutting is carried out with this tool, then a concave sphere with the same size of the sphere on the tool is formed. Because any helix angle will still produce a tool that forms a properly shaped cut, there is no demand for spherical cutting tools with constant helix. That is, even if the efficiency and performance are poor, the designed shape can be produced, and therefore, the need for the tool of the present invention is not properly recognized. Therefore, conventional spherical cutting tools such as ball end mills are far inferior in their performance to cylindrical cutting tools having a constant helix angle like in the square end mills.

SUMMARY OF THE INVENTION

The present invention is intended to overcome the above described disadvantages of the conventional tools by modifying the contour of the cutting edges.

Therefore it is an object of the present invention to provide a spherical cutting tool in which the conventional disadvantages are overcome by arranging the geometrical points of the cutting edges or their tracks.

In achieving the above object, the spherical cutting tool according to the present invention is characterized in that the tangential lines of the respective points of the cutting edges on a spherical surface are formed so as to have a constant angle relative to the axis of the tool, and thus, a machining efficiency is realized in the main cutting edges of the spherical cutting tool like in the main cutting edges of the cylindrical cutting tool.

Further, in achieving the above object, the spherical cutting tool according to the present invention is characterized in that the cutting edges are disposed on a spherical surface, and the helix angle of the cutting edges is constant at any position on the spherical surface. Further, based on the constant helix angle on the spherical surface, the tooth should preferably have a wider land with a smaller relief angle.

Further, the tooth should be made of a material same as that of the tool body.

Further, the tooth made of a super hard alloy metal or a high-speed tool steel may be bonded to the steel body by brazing or by a mechanical means.

BRIEF DESCRIPTION OF THE DRAWINGS

The above object and other advantages of the present invention will become more apparent by describing in detail the preferred embodiment of the present invention with reference to the attached drawings in which:

FIGS. 7A–7C are a front views showing the contour of the peripheral edges of the end mills, in which:

FIG. 7A illustrates a prior art concave relief contour;

FIG. 7B illustrates a prior art flat relief contour; and

FIG. 7C illustrates an eccentric relief contour which is applicable to the spherical edges according to the present invention; and FIGS. 8A–C are a comparison between the contour of the central tooth and the object to be machined, in which:

FIG. 8A illustrates a contour of a central tooth with flat relief of a prior art square end mill;

FIG. 8B illustrates a contour of a central tooth with a concave relief of a prior art spherical cutting tool; and FIG. 8C illustrates a contour of a central tooth with an eccentric relief of a spherical cutting tool according to the present invention.

DETAILED DESCRIPTION OF THE INVENTION

Now the present invention will be described in detail in such a manner that those ordinarily skilled in the art can carry out the present invention.

Figure 6A:
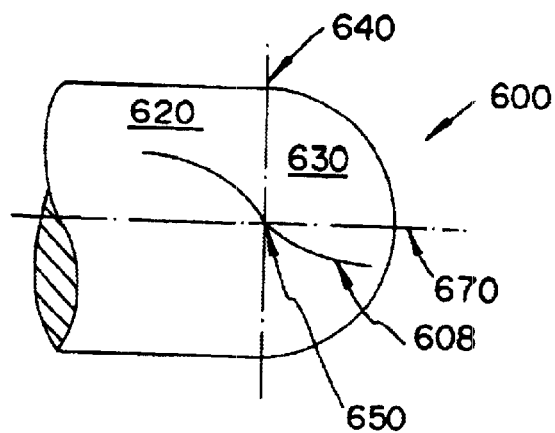
FIGS. 6A, 6B, and 6C illustrate the relationship between the sphere central angle, the axis rotational angle, and the helix angle when a constant helix is formed on a spherical surface according to the present invention.
Figure 6B:
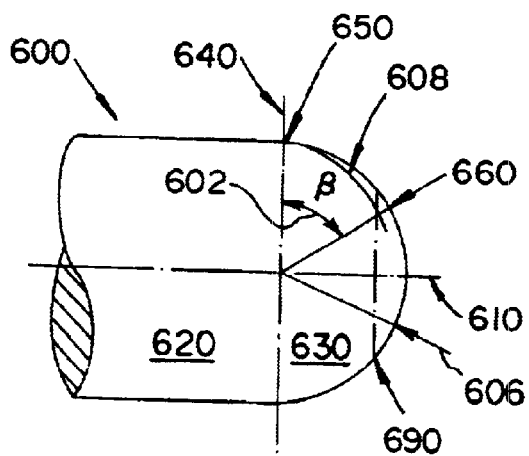
Figure 6C:
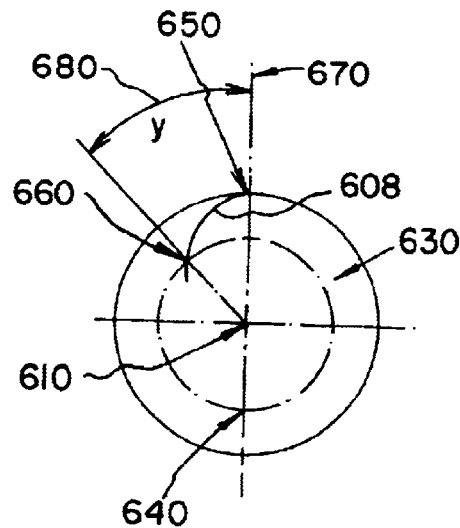

FIGS. 6A–C illustrate the top, side and front views, respectively, to show the relationship between the sphere central angle β, 602, the axis rotational angle y, 680, and the helix angle H when the constant helix is formed on the spherical surface according to the present invention.

The spherical cutting tool according to the present invention is constituted such that a hemisphere 620 and a cylinder 630 with the same radius r 606 are combined together across a virtual boundary face 640 to form a combined body 600. Now, it is assumed that an arbitrary curve 608 is drawn on the spherical surface. Further, the crossing point between the virtual boundary face 640 and the curve 608 will be called the "starting point of the curve on the spherical surface" 650, and a virtual plane which covers the starting point of the curve 650 and the axis 610 of the combined body 600 will be called the "reference plane" 670. Further, the angle between the reference plane 670 and the radial line of a certain point 660 on the arbitrary curve 608 will be called "axial rotational angle y" 680. Further, the angle between the virtual boundary face 640 and the radial line of a certain point on the arbitrary curve 608 will be called "sphere central angle A" 602. Then an arbitrary position can be expressed by r 606, β 602 and y 680.

When defining the relationship between r, p and y, the present inventor found the fact that y and 0 are mutually subordinate through "tan H", when the points on the cutting edges maintain a constant helix angle H. That is, he found the relationship "y = p *tan H".

Figure 1:
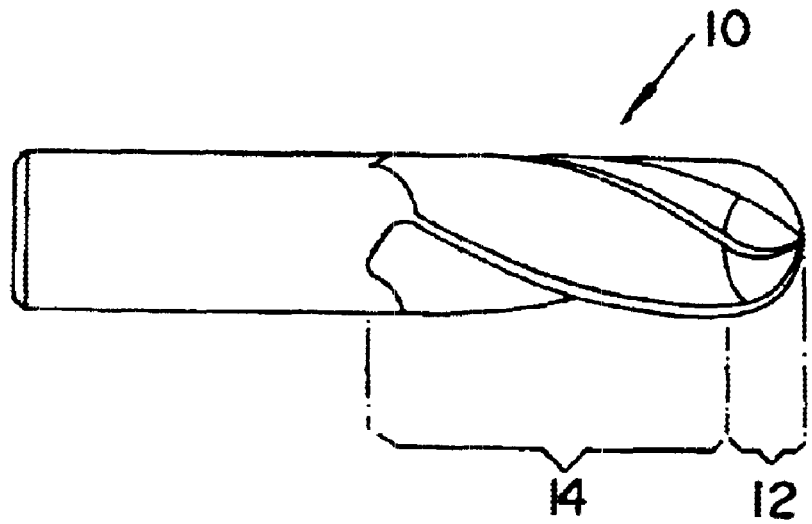
FIG. 1 illustrates a spherical cutting tool.
Figure 2:
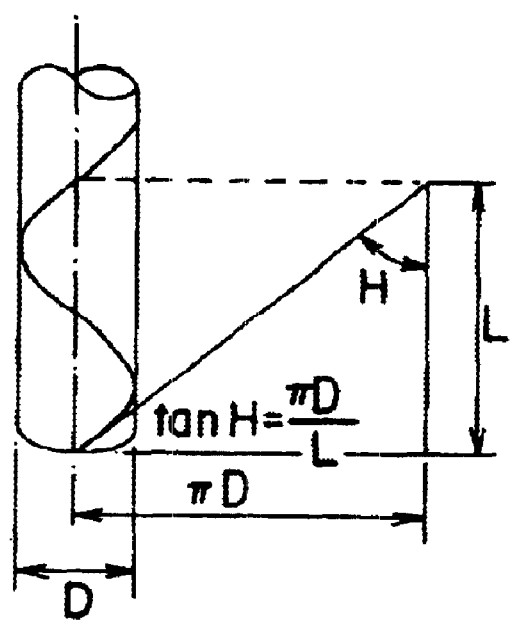
FIG. 2 illustrates the relationship between helix angle, lead, and tool diameter in a cylindrical cutting tool.
Figure 3:
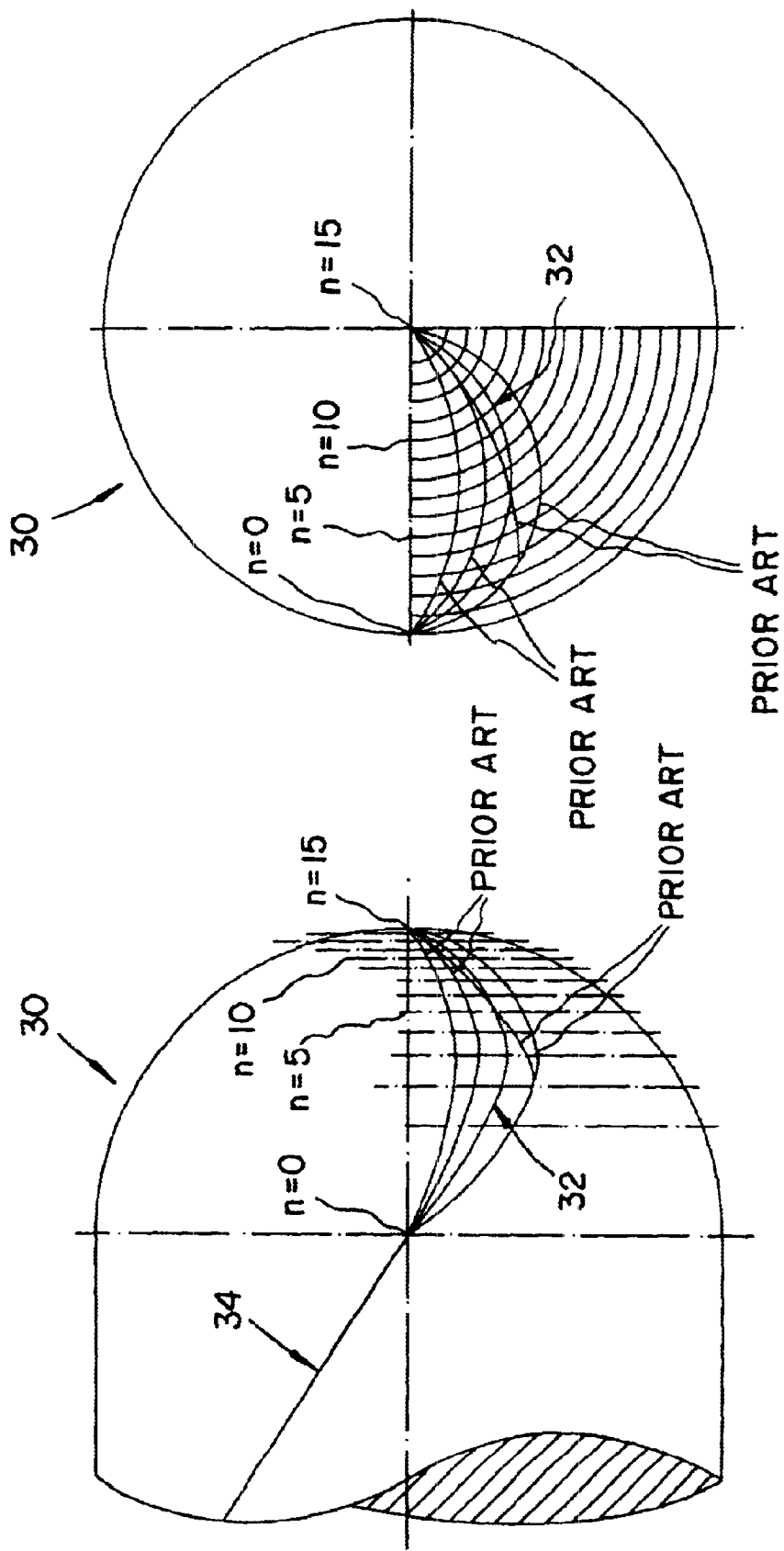
FIGS. 3A and 3B illustrate examples of the positioning of the spherical cutting edge of the present invention and in the prior art for a spherical cutting tool which has a pherical edge disposed with a constant helix angle of 30 degrees.
Figure 4:
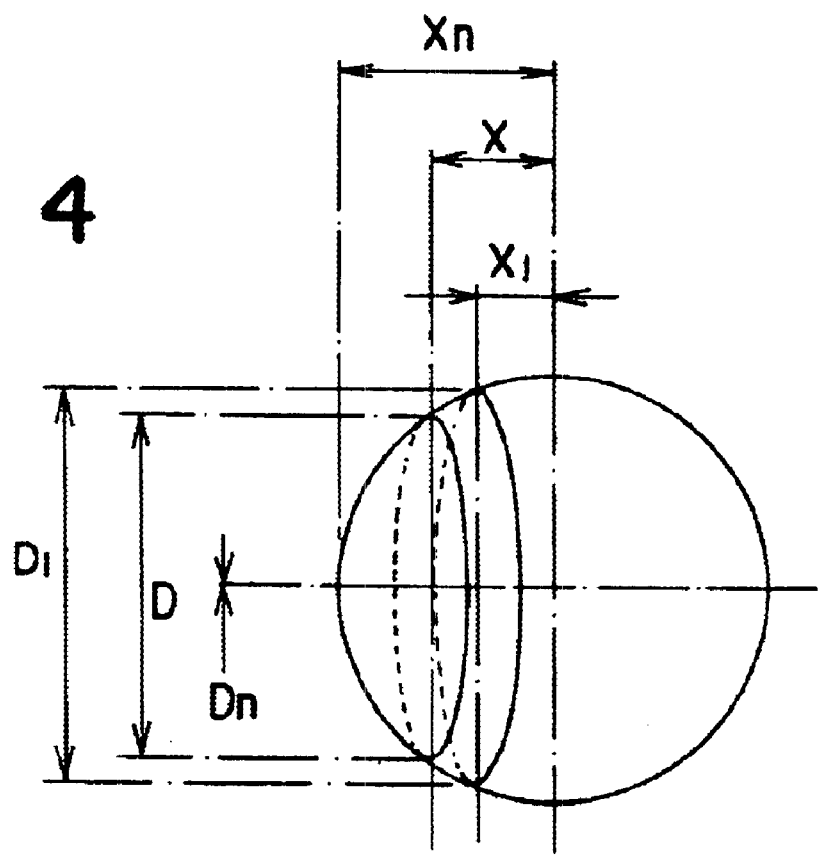
FIG. 4 illustrates the fact that the diameter of the spherical cutting tool is varied along the axis of the tool.
Figure 5:
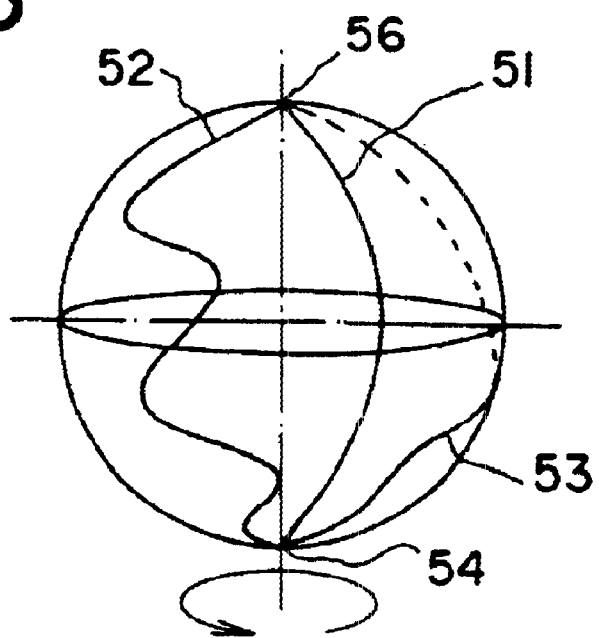
FIG. 5 illustrates the fact that as a spherical body rotates, any curve on the spherical surface draws a sphere.

In other words, it is assumed that the cutting edges are disposed at "p *tan H" from the reference plane with a sphere central angle of p (p = 0 to 90 degrees). Then the tooth has a perfectly constant helix angle of H degrees. That is, when the helix angle is decided suitably to the use of the tool, the axial rotational angle can be calculated based on a formula in which the tan value of helix angle is a constant, and the sphere central angle P is a variable. Then, connecting the cross points by a line, the curves, i.e., the cutting edges with the predetermined constant helix angle will be obtained. As an example, the track 32 of a helix angle of 30 degrees is illustrated in FIGS. 3A–B.

In view of the formula "y=p*tan H", the factors for obtaining a constant helix angle are not related to r at all. This is a feature that is quite different from the fact that the helix angle of the conventional cylindrical tool is directly governed by the tool diameter D, i.e., 2r. In the spherical cutting tool having a certain constant helix angle, producing and/or regrinding are possible with a cam in the mechanical machine or a program in the numeric-controlled machine, regardless of the size of the tool diameter. Further, the edges have a fixed relationship with r, P and y, and therefore, they can be easily disposed on the spherical surface.

Figure 7A:
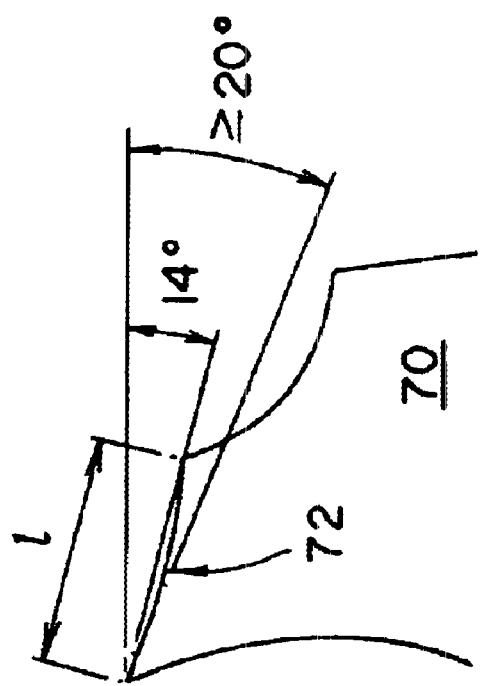
Figure 7B:
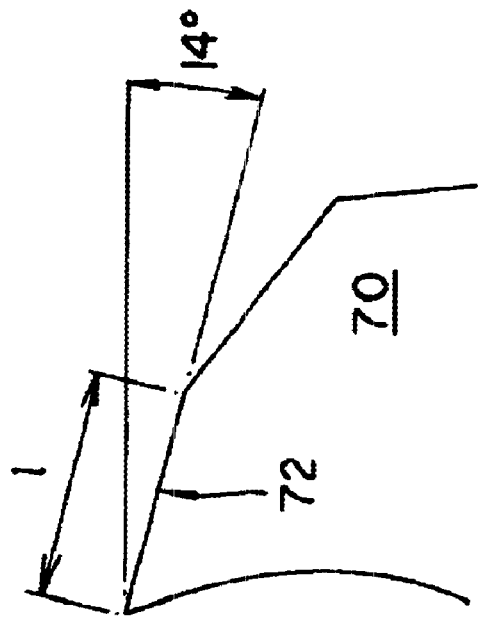
Figure 7C:
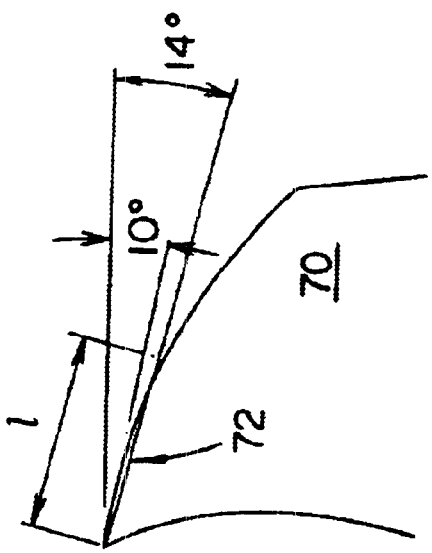

One advantage of the constant the helix angle is that the tooth 70 can be formed with an eccentric relief in land 72, as illustrated in FIG. 7C. The conventional prior art spherical cutting tools have either a concave relief in land 72, as illustrated in FIG. 7A or a flat relief in land 72, as illustrated in FIG. 7B (which is abnormal).

Figure 8A:
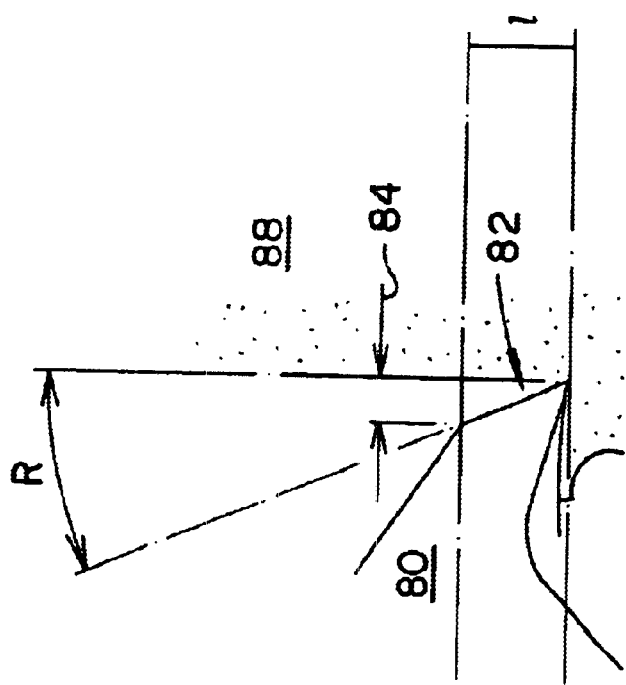
Figure 8B:
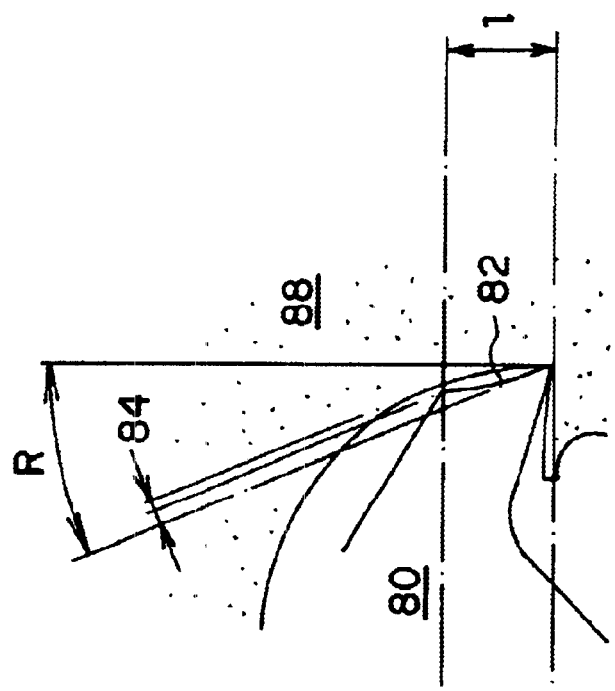
Figure 8C:
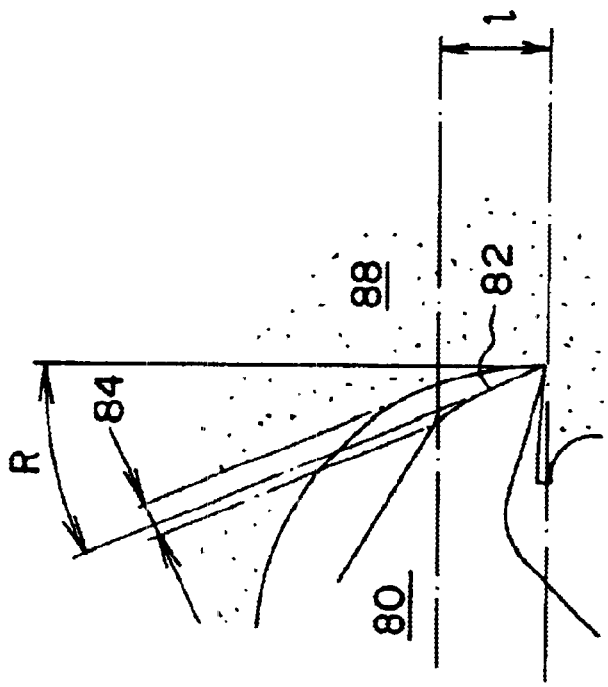

FIGS. 8A–C are a comparison of the amount of relief 84 between the contour of the central tooth 80 and the object to be machined 88, in which: FIG. 8A illustrates a contour of a central tooth 80 with flat relief in land 82 of a prior art square end mill; FIG. 8B illustrates a contour of a central tooth 80 with a concave relief in land 82 of a prior art spherical cutting tool; and FIG. 8C illustrates a contour of a central tooth 80 with an eccentric relief in land 82 of a spherical cutting tool according to the present invention.

In the prior art, in order to maintain the functions of the clearance, either the land width l had to be made narrower, or the relief angle R had to be increased, resulting in the strength of the tooth being weakened. This problem becomes more serious as the tool diameter is made smaller and as it approaches the tool axis. Accordingly, prior art spherical cutting tools cannot be operated at a higher feed rates. The eccentric relief of the present invention that has solved the conventional problems of the concave and flat forms is governed by the following relationships: tan S =tan R/cos H, or tan S =tan R*tan H, where R is the relief angle, and S is the setting angle. If the helix angle is different at every position on a cutting edge, then the setting angle has to be varied accordingly, but this is actually impossible. On the other hand, if the cutting edges have a constant helix angle, then the tooth can be formed with an eccentric relief, with the setting angle fixed. In this case, the tooth can be reinforced with a relatively small relief angle and a wide land width. Therefore, the tool can be operated at a higher feed rate, thereby improving the machining efficiency.

Further, a tooth made of super hard alloy metal or high-speed tool steel may be bonded to the steel body by brazing or by a mechanical means.

In the present invention, the constant angle refers to the fact that the same magnitude of angle is realized at any point on the cutting edges. The lead refers to the advancing distance of the cutting edge in the axial direction during one rotation of the tool having the helical cutting edges. Further, the tool diameter refers to the distance of a line passing through the center of the circumference of the tool and ending at two points on the circumference. Further, similar to the helix on the cylindrical portion of the tool, the spiral refers to the curve which is formed in the form of a vortex on a cone or on a spherical surface. The angle between the spiral and the tool axis is called "spiral angle". Thus, in some cases, "spiral angle" is distinguished from the helix angle, but in the present invention, the spiral angle and the helix angle are made to have the same meaning.

In the above, the present invention has been described based on the specific preferred embodiment, but it should be apparent to those ordinarily skilled in the art that various changes and modifications can be made without departing from the scope of the present invention.

According to the present invention as described above, the cutting edges have a constant helix angle, and the tooth is formed with an eccentric relief. Therefore, the teeth are reinforced with a relatively small relief angle and a wide land width, so that the tool can be operated at a higher feed rate, thereby improving the machining efficiency.

What is claimed is:

1. A spherical cutting tool, comprising:

a body having a central axis;

a spherical surface; and at least one cutting edge formed on said spherical surface, wherein tangential lines of points on said at least one cutting edge have a constant helix angle relative to said central axis.

2. The spherical cutting tool of claim 1, wherein said at least one cutting edge comprises a plurality of cutting edges formed on said spherical surface.

3. The spherical cutting tool of claim 2, further comprising a cylindrical body portion with peripheral cutting edges joined to said body and extending along said central axis.

4. The spherical cutting tool of claim 1, wherein a tooth formed by said cutting edge has an eccentric relief dimensioned so as to provide an increase in an amount of relief when land dimension remains constant.

5. The spherical cutting tool of claim 1, wherein a tooth formed by said cutting edge has a eccentric relief dimensioned so as to provide an increase in land dimension when an amount of relief remains constant.

6. The spherical cutting tool of claim 2, wherein teeth formed by said cutting edges have an eccentric relief dimensioned so as to provide an increase in an amount of relief when land dimension remains constant.

7. The spherical cutting tool of claim 2, wherein teeth formed by said cutting edges have an eccentric relief dimensioned so as to provide an increase in land dimension when an amount of relief remains constant.

8. The spherical cutting tool of claim 3, wherein a tooth formed by said cutting edge is formed from the same material used to form said body.

9. The spherical cutting tool of claim 3, wherein a tooth formed by said cutting edge is formed from a material selected from the group consisting of super hard tool material and high-speed tool steel.

10. The spherical cutting tool of claim 9, wherein said tooth is bonded to said body of said tool said by means selected from the group consisting of mechanical means and brazing.

11. A method of improving strength and efficiency of a spherical cutting tool having a body with a central axis, a spherical surface, and at least one cutting edge on said spherical surface, comprising:

providing a constant helix angle for said cutting edge relative to said axis; and providing an eccentric relief with a reduced relief angle to increase a land width.

12. The method of improving strength and efficiency of a spherical cutting tool of claim 11, further comprising making a tooth formed by said cutting edge from the same material used to form said body of said tool.

13. The method of improving strength and efficiency of a spherical cutting tool of claim 11, further comprising making a tooth formed by said cutting edge from a material selected from the group consisting of super hard tool material and high speed tool steel.

14. The method of improving strength and efficiency of a spherical cutting tool of claim 13, further comprising bonding said tooth to said body of said tool and by means selected from the group consisting of mechanical means and brazing.

* * * * *